US006659122B1

(12) United States Patent
Zahdeh et al.

(10) Patent No.: US 6,659,122 B1
(45) Date of Patent: Dec. 9, 2003

(54) DUAL TANK SIMULTANEOUS FILL SYSTEM

(75) Inventors: Akram R. Zahdeh, Davisburg, MI (US); Edward J. Strzelecki, Oxford, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/238,163

(22) Filed: Sep. 10, 2002

(51) Int. Cl.$^7$ ................................................ B65B 3/06
(52) U.S. Cl. ........................ 137/256; 141/35; 141/237
(58) Field of Search ................................ 137/256, 255, 137/265; 141/35, 36, 311 R, 237

(56) References Cited

U.S. PATENT DOCUMENTS

| | | | | |
|---|---|---|---|---|
| 4,390,049 A | * | 6/1983 | Albertson | 141/92 |
| 4,765,359 A | | 8/1988 | Burnett | |
| 5,954,971 A | * | 9/1999 | Pages et al. | 210/739 |
| 5,983,932 A | | 11/1999 | Wagner et al. | |
| 6,382,240 B1 | * | 5/2002 | MacDonald | 137/255 X |
| 6,508,280 B2 | * | 1/2003 | Capstran | 141/98 |

* cited by examiner

Primary Examiner—Kevin Lee
(74) Attorney, Agent, or Firm—Laura C. Hargitt

(57) ABSTRACT

A fuel supply system for an automotive vehicle having an internal combustion engine, comprises a fluid inlet line configured to receive fuel from a vehicle refueling station. A manifolded Y-connector includes an inlet port at an upper end of the Y-connector and in fluid communication with the fluid inlet line, an elliptical lower wall, a manifolded section extending from the inlet port to the elliptical lower wall, and a first and a second outlet port having substantially equal circular cross sections and each having a straight portion extending perpendicularly from the lower wall. A height of the manifolded section from the upper end to the lower wall is approximately four to five times a diameter of one of the outlet ports. The supply system further includes first and second fuel tanks fluidly connected to the first and second outlet ports of the manifolded Y-connector. Whereupon filling the fuel supply system, the manifolded Y-connector operates to deliver fuel to the first fuel tank first and to the second fuel tank second and accommodates any filling turbulence.

11 Claims, 2 Drawing Sheets

DUAL TANK SIMULTANEOUS FILL SYSTEM

BACKGROUND OF THE INVENTION

1. Field of the Invention

The invention relates to a dual fuel tank system having a single fuel filler inlet for a vehicle.

2. Background

Multiple fuel tank systems for automotive vehicles are well known, for increasing fuel capacity in an automotive vehicle to increase its driving range. Numerous methods have been employed to provide a filling capability for the multiple fuel tanks as well as the capability for drawing fuel from those tanks to feed the internal combustion engine of the vehicle. Structures for filling the fuel tanks have ranged from having individual fuel inlet ports, for instance on each side of the vehicle, to a single fuel inlet port with a Y-type connector to split the fuel flow. Another system, disclosed in U.S. Pat. No. 5,983,932 and commonly owned, comprises a cross-flow pipe between the multiple fuel tanks to allow simultaneous filling of the fuel tanks from a single inlet port. As the fuel level in a first fuel tank rises, the fuel will naturally flow to the second fuel tank, the fuel seeking its own level between the connected tanks.

An alternative method of filling multiple fuel tanks is disclosed in U.S. Pat. No. 4,765,359, which discloses multiple fuel inlet ports, preferably located on opposite sides of an automotive vehicle, connected to a common fuel tank filling manifold, whereby pumping fuel into either of the inlet ports directs fuel into the manifold, thereby filling the fuel tanks.

A common limitation of the prior art fuel tank systems is that effective filling of the multiple fuel tanks is largely dependent upon relative fill levels between tanks, fuel and ambient temperature, fuel reid vapor pressure, and vehicle attitude. For instance, when vehicle packaging forces the tanks to be positioned at different elevations, the fuel tank with the smaller pressure drop between the filler neck and the tank will be filled sooner than the tank with the higher pressure drop, thus potentially shutting off the fuel flow prior to complete filling of the tanks. Premature nozzle shut-off and fuel spit-back through the fuel inlet port are undesirable to a customer.

A further consideration is that fuel systems today must meet certain government mandated onboard refueling vapor recovery standards. This means that the system shall capture a minimum of 95% of the fuel vapors during a specific fill test. Thus, the vapors escaping from the filler neck must be less than or equal to 5% of the fuel vapors generated during a refill event.

It would be advantageous to provide a dual tank simultaneous fill system that is adaptable to filling both tanks to capacity under all operating conditions and fuel characteristics.

SUMMARY OF THE INVENTION

The invention relates to a fuel supply system for an automotive vehicle of the type having an internal combustion engine, the fuel supply system including two fuel storage tanks, a fuel pumping mechanism for transporting fuel from at least one of the storage tanks to the engine, a fuel transfer system for conveying fuel from one of the storage tanks to another of the storage tanks, and a fuel filling system for adding fuel to the system from a gas station, the fuel filling system comprising a single fuel inlet line. The fuel supply system further includes a manifolded Y-connector fluidly connecting the fuel inlet port with the two fuel storage tanks. The manifolded Y-connector is comprised of a manifolded section, an inlet port depending from an upper end of the manifolded section and in fluid communication with the fluid inlet line, and two outlet ports depending from a lower wall of the manifolded section. Each of the two outlet ports are fluidly connected to one of the first and second tanks. Where upon filling the fuel supply system, the manifolded Y-connector operates to first deliver fuel to the first tank and then to fill the second tank, while accommodating filling turbulence.

Other features of the invention will be apparent from the ensuing description in conjunction with the accompanying drawings.

DETAILED DESCRIPTION

Figure 1:
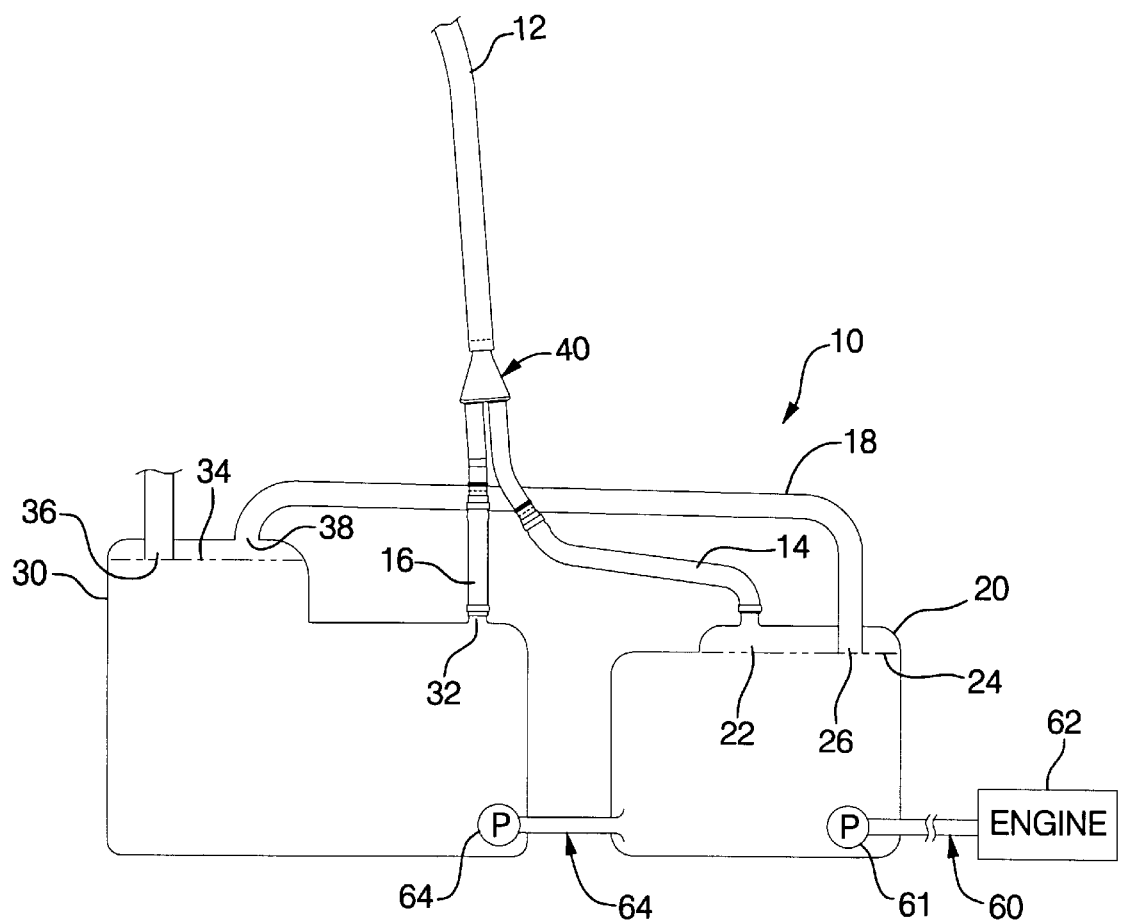
FIG. 1 is a schematic representation of a dual fuel tank simultaneous fill system according to the invention.

Referring to FIG. 1, a dual tank simultaneous fill system 10, according to the invention, comprises a first fuel tank 20 and a second fuel tank 30, each fluidly connected to a fuel inlet line 12. The first tank 20 is fluidly connected to fuel inlet line 12 through a first tank branch line 14 and a flow-directing manifolded Y-connector 40. The second tank 30 is fluidly connected to the fuel inlet line 12 through a second tank branch line 16 and the manifolded Y-connector 40. The first tank 20 is further fluidly connected to the first tank branch line 14 through a first tank inlet opening 22. The second tank 30 is further connected to the second tank branch line 16 by a second tank inlet 32. The first and second tanks 20, 30 are further fluidly connected by a vapor relief line 18 from a first tank vent/overflow outlet 26 to a second tank overflow inlet 38. The second tank 30 further comprises a vapor relief outlet 36 appropriately vented to atmosphere as is well known in the art.

Figure 2:
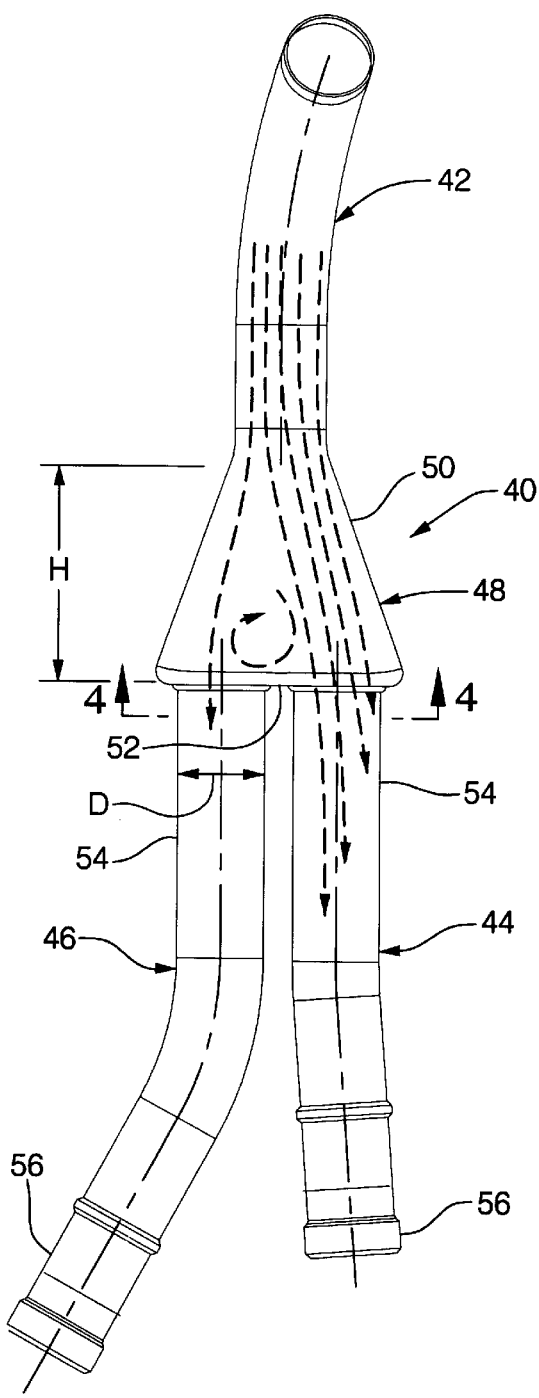
FIG. 2 is an enlarged view of a manifolded Y-connector for the system of FIG. 1 illustrating fuel flow to the first fuel tank.

Referring now to FIG. 2, the manifolded Y-connector 40 comprises an inlet port 42, a first outlet port 44, and a second outlet port 46. The Y-connector 40 further comprises a manifolded section 48 where the inlet port 42 delivers fuel to the manifolded section at an upper end 50 thereof, and the outlet ports 44,46 depend from a lower, horizontal wall 52 of the manifolded section. The first and second outlet ports 44, 46 each have straight segments 54 of approximately equal length, which extend generally parallel to each other and perpendicular to the horizontal wall 52 to which they depend. The lower ends 56 of the outlet ports 44,46 may then diverge. The first and second outlet ports 44,46 have substantially equal diameters.

Figure 4:
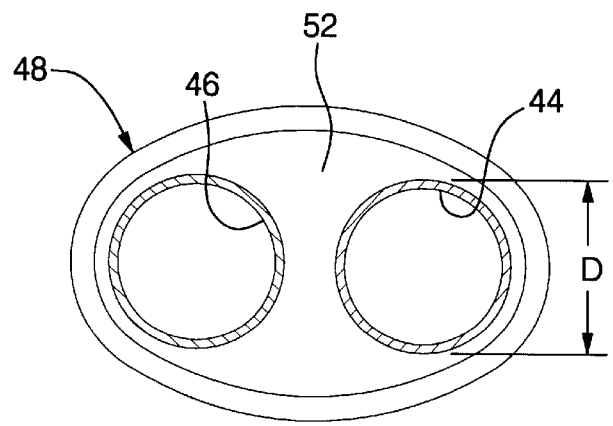
FIG. 4 is a sectional view taken generally along the plane indicated by lines 4—4 in FIG. 2.

In a preferred embodiment, the manifolded section 48 extends integrally from the inlet port 42 at its upper end 50, to an elliptical cross-section where the major and minor diameters increase to a maximum at its lower horizontal wall 52, in what will be termed an elliptical-conical shape. The lower horizontal wall 52 is sized to be just large enough to support the depending outlet ports 44,46, as shown in FIG. 4. An ellipse is the most efficient shape to accommodate two circular openings while minimizing excess material.

In an alternative configuration, although not shown, the major and minor diameters at each cross section of the manifolded section may be equal, and thus be simply a conical shape with circular cross sections.

The manifolded Y-connector 40 may be formed by the process of hydroforming, casting, or stamping and welding. The Y-connector is joined to the fuel inlet line 12 and two tank branch lines 14,16 by conventional means such as hoses and clamps.

Figure 3:
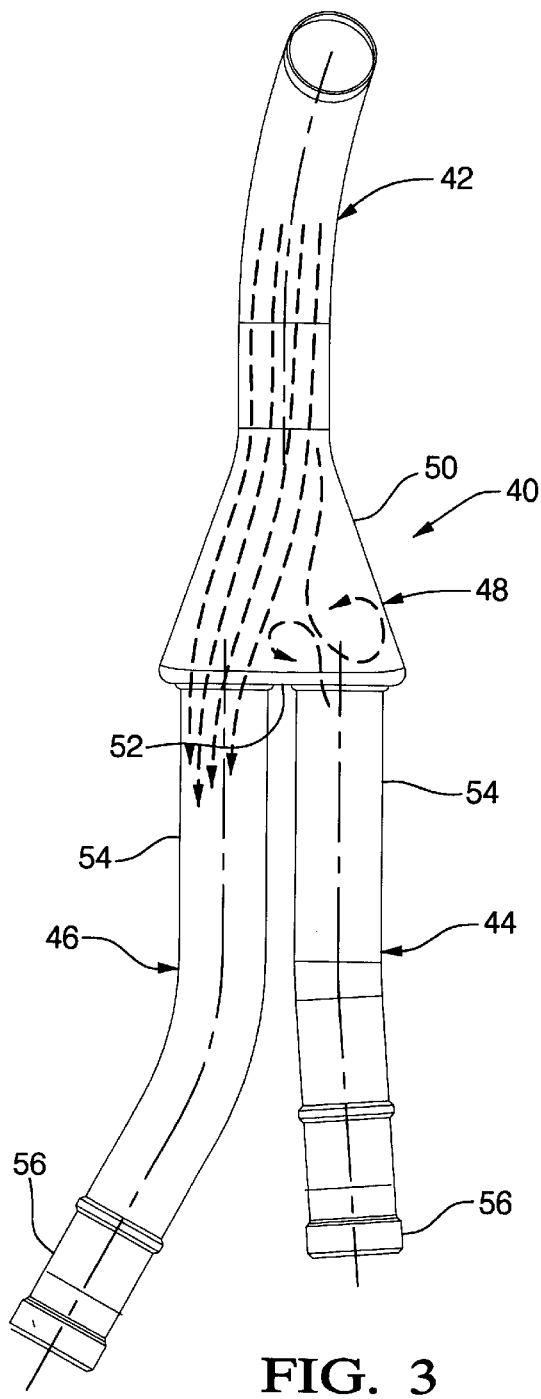
FIG. 3 is an enlarged view of the manifolded Y-connector for the system of FIG. 1 illustrating fuel flow to the second fuel tank.

During the initial filling of the dual tank simultaneous fill system 10, fuel flows through the fuel inlet line 12 and into the manifolded Y-connector 40. Fuel then flows to the tank which is either at the highest elevation due to the larger siphoning effect, or to the tank with the shortest pipe due to the smaller head loss in the branch line. As shown in the figures, it is assumed that fuel flows to the first tank 20 before the second tank 30. Fuel flows through the first outlet port 44 and the first tank branch line 14 to the first tank 20. This expected fuel flow pattern is schematically illustrated in FIG. 2. After the fuel reaches the fill line 24, the first tank inlet opening 22 and vent/overflow outlet 26 are effectively closed off as the first tank 20 is filled. Additional fuel flow backs up in the manifolded section 48 and is forced to flow into the second outlet port 46, and through the second tank branch line 16 to the second tank 30. FIG. 3 illustrates the expected flow pattern during this stage. As the second tank 30 fills, excess vapor pressure is relieved through the vapor relief outlet 36 until the fuel in tank 30 reaches its fill line 34, thereby sealing vapor relief outlet 36. Upon sealing of vapor relief outlet 36, sufficient pressure will develop in the fuel inlet line 12 to activate the typical automatic fuel shut off of a fuel dispensing nozzle (not shown).

The manifolded section 48 accommodates and absorbs the disturbances occurring due to the fuel backing up, or the imbalance due to elevation or head loss in the system. It operates by providing the additional volume needed to allow for turbulence to smooth out during filling of the tanks. In order to have the volume required to provide this function, it has been found that the height H of the manifolded section 48 should be on the order of four to five times the diameter D of the outlet ports. For example if the outlet ports 44,46 each have a twenty millimeter diameter, then the height H of the manifolded section should be on the order of eighty to one hundred millimeters.

With this fuel supply system, the likelihood for premature nozzle shut-off or fuel spit back should be minimized. This is in part due to the outlet ports having parallel and equal length straight segments before diverging. This ensures a generally equal pressure drop across the inlet port 42 and each of the outlet ports.

In the preferred embodiment of the dual fuel tank simultaneous fill system, an engine fuel supply system 60 having a first pump 61 draws fuel only from the first tank 20 and delivers it to the engine 62. As the system is configured to supply fuel primarily to the first tank 20, the engine fuel supply system 60 has immediate access to any fuel added to the system. As an example, in a situation where a driver has run out of fuel along the side of the road, the first gallon of fuel out of a portable container will necessarily flow into the first tank 20 where it is available to the engine fuel supply system. As the engine fuel supply system 60 draws fuel from the first tank 20, a supplemental fuel transfer system 64 having a second pump 66 transfers fuel from the second tank 30 to the first tank 20. Such a supplemental fuel transfer system is generally of a lower pressure and performance specification than the system supplying fuel to the engine, and is therefore lower in cost. It further eliminates the need for automatic switching controls or manual switching controls for controlling multiple high-pressure type fuel pumps connected to multiple fuel tanks.

While the invention has been specifically described in connection with certain specific embodiments thereof, it is to be understood that this is by way of illustration and not of limitation, and the scope of the appended claims should be construed as broadly as the prior art will permit.

What is claimed is:

1. A fuel supply system for an automotive vehicle of the type having an internal combustion engine, comprising:
    a fluid inlet line configured to receive fuel from a vehicle refueling station;
    a manifolded Y-connector comprising a manifolded section, an inlet port depending from an upper end of the manifolded section and in fluid communication with the fluid inlet line, and a first and a second outlet port each depending from a lower wall of the manifolded section;
    a first fuel tank;
    a first branch line fluidly connected to the first outlet port of the manifolded Y-connector and to the first fuel tank;
    a second fuel tank;
    a second branch line fluidly connected to the second outlet port of the manifolded Y-connector and to the second fuel tank;
    whereupon filling the fuel supply system, the manifolded Y-connector operates to deliver fuel to the first fuel tank first and the second fuel tank second and accommodates any filling turbulence.

2. The system according to claim 1, wherein the inlet port of the Y-connector has a circular cross section, the lower wall has an elliptical cross section and wherein the manifolded section extends from the circular inlet port to the elliptical lower wall.

3. The system according to claim 2, wherein the size of the lower wall is minimized to accommodate the depending first and second outlet ports.

4. The system according to claim 1, wherein the lower wall of the manifolded Y-connector has a circular cross section.

5. The system according to claim 1, wherein the first and second outlet ports have substantially equal circular cross sections and a height of the manifolded section from the upper end to the lower wall is approximately four to five times a diameter of one of the first and second outlet ports.

6. The system according to claim 1, wherein each of the first and second outlet ports have a straight portion extending perpendicularly from the lower wall and thus parallel to each other.

7. The system according to claim 1, further comprising an engine fuel supply system with a first pump to deliver fuel from the first fuel tank to the engine and a supplemental fuel transfer system with a second pump to deliver fuel from the second fuel tank to the first fuel tank.

8. The system according to claim 7, further comprising a vapor venting system fluidly connecting the tanks to each other and to the atmosphere.

9. A fuel supply system for an automotive vehicle of the type having an internal combustion engine, comprising:
    a fluid inlet line configured to receive fuel from a vehicle refueling station;

a manifolded Y-connector comprising an inlet port at an upper end of the Y-connector and in fluid communication with the fluid inlet line, a lower wall having an elliptical cross section, a manifolded section extending from the inlet port to the elliptical lower wall, and a first and a second outlet port having substantially equal circular cross sections and each having a straight portion extending perpendicularly from the lower wall, wherein the size of the lower wall is minimized to accommodate the depending first and second outlet ports, and wherein a height of the manifolded section from the upper end to the lower wall is approximately four to five times a diameter of one of the first and second outlet ports;

a first fuel tank;

a first branch line fluidly connected to the first outlet port of the manifolded Y-connector and to the first fuel tank;

a second fuel tank;

a second branch line fluidly connected to the second outlet port of the manifolded Y-connector and to the second fuel tank;

whereupon filling the fuel supply system, the manifolded Y-connector operates to deliver fuel to the first fuel tank first and the second fuel tank second and accommodates any filling turbulence.

10. The system according to claim 9, further comprising an engine fuel supply system with a first pump to deliver fuel from the first fuel tank to the engine and a supplemental fuel transfer system with a second pump to deliver fuel from the second fuel tank to the first fuel tank.

11. The system according to claim 9, further comprising a vapor venting system fluidly connecting the tanks to each other and to the atmosphere.

* * * * *